US008709578B2

(12) United States Patent
Zhang et al.

(10) Patent No.: US 8,709,578 B2
(45) Date of Patent: Apr. 29, 2014

(54) BAMBOO SCRIMBER AND MANUFACTURING METHOD THEREOF

(75) Inventors: Qisheng Zhang, Hangzhou (CN); Shenxue Jiang, Hangzhou (CN); Hai Lin, Hangzhou (CN); Xufeng Xu, Hangzhou (CN); Hongzheng Liu, Hangzhou (CN); Bin Xu, Hangzhou (CN); Wen He, Hangzhou (CN)

(73) Assignee: Dasso Industrial Group Co., Ltd., Hangzhou, Zhejiang (CN)

( * ) Notice: Subject to any disclaimer, the term of this patent is extended or adjusted under 35 U.S.C. 154(b) by 463 days.

(21) Appl. No.: 12/934,868

(22) PCT Filed: Sep. 9, 2008

(86) PCT No.: PCT/CN2008/001596
§ 371 (c)(1),
(2), (4) Date: Sep. 27, 2010

(87) PCT Pub. No.: WO2009/127092
PCT Pub. Date: Oct. 22, 2009

(65) Prior Publication Data

US 2011/0027529 A1 Feb. 3, 2011

(30) Foreign Application Priority Data

Apr. 18, 2008 (CN) .......................... 2008 1 0093764

(51) Int. Cl.

| | |
|---|---|
| ***B27J 7/00*** | (2006.01) |
| ***B32B 3/24*** | (2006.01) |
| ***B32B 38/04*** | (2006.01) |
| ***B27N 3/08*** | (2006.01) |
| ***B32B 21/08*** | (2006.01) |

(52) U.S. Cl.
USPC ........... 428/136; 428/534; 428/535; 156/252; 156/256; 156/257; 144/333; 144/347

(58) Field of Classification Search
USPC .......... 428/136, 534, 535; 156/252, 256, 257; 144/333, 347
See application file for complete search history.

(56) References Cited

U.S. PATENT DOCUMENTS

| | | | | |
|---|---|---|---|---|
| 4,318,433 | A * | 3/1982 | Amundsen | 144/24.1 |
| 5,489,460 | A * | 2/1996 | Clarke et al. | 428/106 |
| 5,972,467 | A | 10/1999 | Washo | |
| 2002/0195169 | A1* | 12/2002 | chen | 144/347 |
| 2008/0263890 | A1* | 10/2008 | Picard | 34/282 |

FOREIGN PATENT DOCUMENTS

| | | | |
|---|---|---|---|
| CN | 1156655 | A | 8/1997 |
| CN | 1312151 | A | 9/2001 |
| CN | 1335217 | A | 2/2002 |
| CN | 1401464 | A | 3/2003 |
| CN | 1462676 | A | 12/2003 |
| CN | 1597277 | A | 3/2005 |
| CN | 1718385 | A | 1/2006 |

(Continued)

*Primary Examiner* — William P Watkins, III
(74) *Attorney, Agent, or Firm* — Howard & Howard Attorneys PLLC

(57) ABSTRACT

A bamboo scrimber includes a plurality of pressure-pressed bamboo strips impregnated with an adhesive and modified through heat-treatment. Each of the bamboo strips is formed with a plurality of slots penetrating through the bamboo strip substantially in a direction of thickness defined by the bamboo strip. A substantially longitudinal direction defined by the slots is substantially consistent with a substantially longitudinal direction defined by fibers of the bamboo strip.

19 Claims, 7 Drawing Sheets

(56) References Cited

FOREIGN PATENT DOCUMENTS

| | | | | |
|---|---|---|---|---|
| CN | 2825280 | Y | | 10/2006 |
| CN | 1864953 | A | | 11/2006 |
| CN | 1944011 | A | | 4/2007 |
| CN | 100999092 | A | | 7/2007 |
| CN | 200960684 | Y | | 10/2007 |
| FR | 2883788 | A1 | * | 10/2006 |
| WO | 9944796 | A1 | | 10/1999 |

* cited by examiner

BAMBOO SCRIMBER AND MANUFACTURING METHOD THEREOF

CROSS-REFERENCE TO RELATED APPLICATIONS

This application claims priority to and benefit of the filing date of PCT Patent Application PCT/CN2008/001596 entitled "Bamboo Scrimber and Manufacturing Method Thereof" and filed on Sep. 9, 2008, which, in turn, claims priority to and benefit of the filing date of Chinese Patent Application 200810093764.4 entitled "Bamboo Scrimber and Manufacturing Method Thereof" and filed on Apr. 18, 2008.

BACKGROUND OF INVENTION

1. Field of Invention

The invention generally relates to a bamboo scrimber and a manufacturing method thereof and more specifically to a bamboo scrimber including a plurality of pressure-pressed bamboo strips impregnated with an adhesive and modified through heat-treatment and a method of manufacturing such bamboo scrimber.

2. Description of Related Art

A bamboo scrimber (generally also referred to as "strand woven bamboo" or "recombined bamboo" in the art) is generally made by cutting bamboo into bamboo tubes, splitting the bamboo tubes, forming the split bamboo into bamboo strips (also referred to as "bamboo sliver") or strands (also referred to as "bamboo filament"), drying the bamboo strands or strips, dipping the bamboo strands or strips into an adhesive, assembling the adhesive-impregnated bamboo strands or strips in a longitudinal direction, and hot-pressing the assembled bamboo strands or strips. And, the bamboo scrimber has a high density and a high strength so that the bamboo scrimber has been widely used in recent years.

In a conventional method, the bamboo is manufactured into bamboo strands. Then, the bamboo strands are dried, dipped into an adhesive, placed into a mold, and high-pressure-pressed and cured to form a bamboo product. However, it is required to manufacture the bamboo into strands so that the process is complex, and time and labor consumption and cost thereof are high.

In another conventional method, the bamboo is manufactured into bamboo strips, and the bamboo strips are dried, dipped into an adhesive, placed into a mold, and high-pressure-pressed and cured to form a bamboo product. However, because the bamboo strips have large thickness and width and high rigidity, when arranging the bamboo strips, bridging between the bamboo strips may not be avoided so that the bamboo strips may not contact with each other sufficiently and be softened during pressing. Therefore, the density of the bamboo product is not uniform, and the surfaces of the bamboo product are rough.

Whether using the bamboo strands or the bamboo strips to form the bamboo scrimber, the bamboo strips and strands are not modified. It is well known that, similar to wood, the bamboo is a porous biomass material and has dry-shrinkage and wet-swelling properties. When the temperature and humidity change, the size of the bamboo scrimber will change. Especially when the bamboo scrimber is used in outdoor environments in which temperature and humidity may dramatically change and there are ultraviolet radiations, the bamboo scrimber (for example, furniture and floors made by the bamboo scrimber) will crack, deform, or degum in a short term, and the size stability thereof is very poor. Moreover, the bamboo comprises more nutritive substances than the wood so that it is extremely easily corroded by decay fungi and mycetes in outdoor environments and has a very poor biological durability.

SUMMARY OF INVENTION

The invention overcomes the disadvantages in the related art in a bamboo scrimber including a plurality of pressure-pressed bamboo strips impregnated with an adhesive and modified through heat-treatment. Each of the bamboo strips is formed with a plurality of slots penetrating through the bamboo strip substantially in a direction of thickness defined by the bamboo strip. A substantially longitudinal direction defined by the slots is substantially consistent with a substantially longitudinal direction defined by fibers of the bamboo strip.

The invention overcomes the disadvantages in the related art also in a method of manufacturing a bamboo scrimber. The method includes steps of preparing bamboo strips from bamboo, forming a plurality of slots in each of the prepared bamboo strips penetrating through the bamboo strip substantially in a direction of thickness defined by the bamboo strip and a substantially longitudinal direction defined by the slots is substantially consistent with a substantially longitudinal direction defined by fibers of the bamboo strip, modifying the formed bamboo strips through heat-treatment, impregnating the modified bamboo strips into an adhesive, drying the impregnated bamboo strips, and pressure-pressing the dried bamboo strips in a mold until the adhesive is cured so as to form the bamboo scrimber.

The invention overcomes the disadvantages in the related art also in a method of manufacturing a bamboo scrimber. The method includes steps of preparing bamboo strips from bamboo, forming a plurality of slots in each of the prepared bamboo strips penetrating through the bamboo strip substantially in a direction of thickness defined by the bamboo strip and a substantially longitudinal direction defined by the slots is substantially consistent with a substantially longitudinal direction defined by fibers of the bamboo strip, impregnating the formed bamboo strips into an adhesive, drying the impregnated bamboo strips, pressure-pressing the dried bamboo strips in a mold until the adhesive is cured so as to form the bamboo scrimber, and modifying the bamboo scrimber through heat-treatment.

Therefore, according to an embodiment of the invention, there is provided a bamboo scrimber that has advantages of low water absorption, high size stability, good biological durability, and special suitability for outdoor environments.

Also according to an embodiment of the invention, there is provided a manufacturing method of a bamboo scrimber that is simple in process, and the bamboo scrimber made by the method has low water absorption, high size stability, and good biological durability.

With the bamboo scrimber according to embodiments of the invention, each bamboo strip may be broken into a plurality of smaller bamboo strips connected with each other by rolling with toothed rolls, thus increasing the surface area of the bamboo strip to be impregnated with the adhesive, increasing the adhesive content, reducing rigidity of the bamboo strip, and avoiding non-uniform density and rough surfaces of the bamboo scrimber due to insufficient contact and insufficient softening of the bamboo strips when pressed. Moreover, the thickness of the bamboo strip may be selected in a very wide range, for example, about 1.0 mm to about 4.5 mm so that the source of bamboo for making the bamboo scrimber may be wide, and the process for forming the bamboo scrimber into the bamboo strips is simple.

Also with the bamboo scrimber according to embodiments of the invention, most hemicelluloses or nearly all the hemicelluloses in the bamboo strips may be degraded mainly through pyrolysis, but celluloses and lignins in the bamboo strips are hardly pyrolysed, and the moisture content of the bamboo strips may be adjusted. After the bamboo strips are heat-treated at a high temperature, the physical and mechanical properties of the bamboo strips may be changed permanently due to change of the chemical composition. For example, the equilibrium moisture content may be reduced by about 30% to about 50%, thus improving the dry-shrinkage and wet-swelling properties. Because the heat-treatment may not cause stress, the size stability may be enhanced, and the hygroscopicity may be significantly reduced. Even if the bamboo scrimber is used in outdoor environments, it may not crack or deform. Because most hemicelluloses or nearly all the hemicelluloses are pyrolysed, various decay fungi lose the nutritive materials upon which they depend for survival, thus achieving the purpose of anti-corrosion and increasing the biological durability of the bamboo scrimber. Although the modulus of rupture of the bamboo scrimber is reduced by about 10% to about 30%, the strength of the bamboo scrimber is still high enough, with a density of not less than 1.0 g/cm$^3$. Any chemical substance is not added during the heat-treatment so that the bamboo scrimber may not pollute soils and water when used in outdoor environments and is environment-friendly.

In other words, the bamboo scrimber made of the bamboo strips that are modified through heat-treatment may have enhanced biological durability, weathering resistance, and size stability and safety and may be environment-friendly, thus being suitable for outdoor floors, outdoor furniture, outdoor buildings, park facilities, steam-bath-house facilities, etc.

Also with the bamboo scrimber according to embodiments of the invention, the bamboo scrimber has no obvious interlayer boundary, and the texture is more uniform, thus avoiding interlayer cracking.

Also with the bamboo scrimber according to embodiments of the invention, the bamboo strips have a good connectivity, and the bamboo scrimber has a more uniform density.

With the manufacturing method of the bamboo scrimber according to embodiments of the invention, the surface area of the bamboo strip to be impregnated with the adhesive is increased, the impregnated adhesive content is increased, the rigidity of the bamboo strip is reduced, and the pressure for pressing the bamboo strips may be decreased. Therefore, the bamboo scrimber has a more uniform density and a good surface quality.

Also with the manufacturing method of the bamboo scrimber according to embodiments of the invention, most hemicelluloses or nearly all the hemicelluloses in the bamboo strips are pyrolysed, but celluloses and lignins in the bamboo strips are hardly pyrolysed. Also, the bamboo strips in which most hemicelluloses or nearly all the hemicelluloses have been pyrolysed are cooled, and the moisture content thereof are adjusted.

Also with the manufacturing method of the bamboo scrimber according to embodiments of the invention, the bamboo scrimber may also have increased biological durability, weathering resistance, and size stability and safety and may be environment-friendly so that the bamboo scrimber is especially suitable for outdoor environments.

Other objects, features, and advantages of the invention will be readily appreciated as the same becomes better understood while reading the subsequent description taken in conjunction with the accompanying drawings.

BRIEF DESCRIPTION OF EACH FIGURE OF DRAWING OF INVENTION

Figure 9:
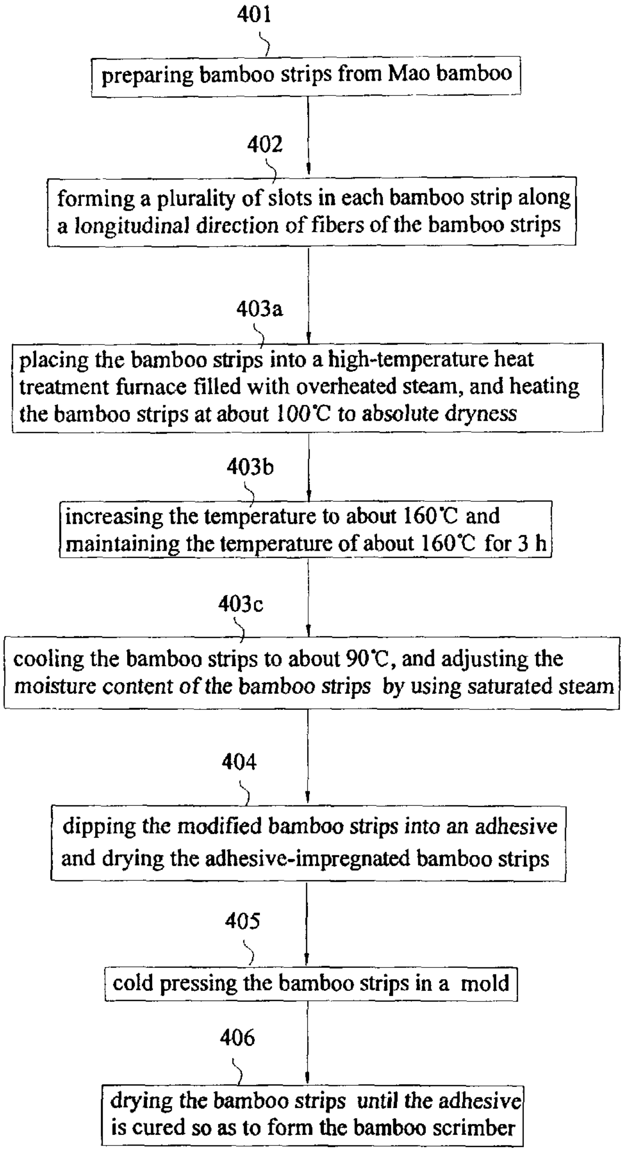
Figure 10:
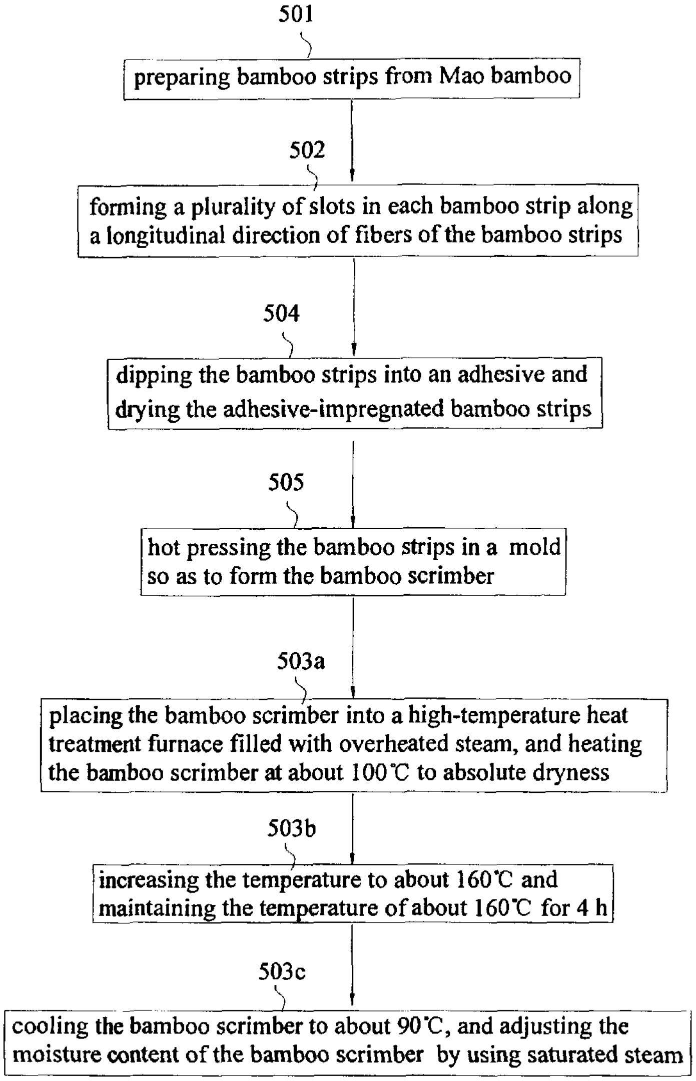

FIG. 9 is a flow chart of the manufacturing method of the bamboo scrimber by using cold-pressing and then drying the bamboo scrimber until the adhesive is cured according to an example of the invention; and FIG. 10 is a flow chart of the manufacturing method of the bamboo scrimber according to an example of the invention in which the bamboo strips are pressed to form the bamboo scrimber and then the bamboo scrimber is modified.

DETAILED DESCRIPTION OF EMBODIMENTS OF INVENTION

Figure 1:
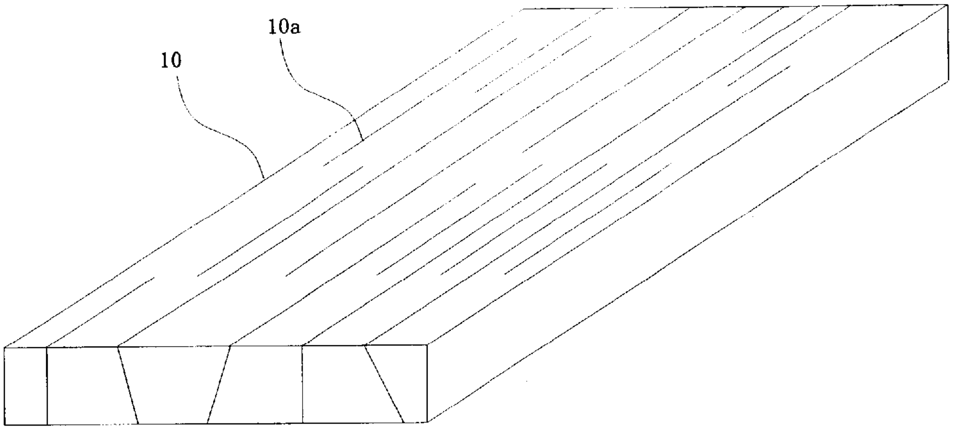
FIG. 1 is a schematic view of a bamboo strip for making the bamboo scrimber according to an embodiment of the invention.
Figure 2:
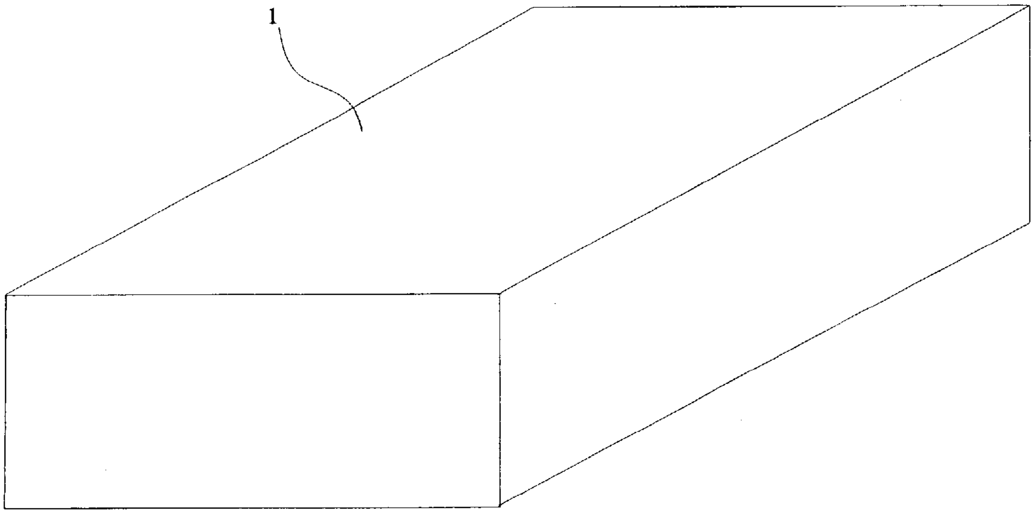
FIG. 2 is a schematic view of the rectangular bamboo scrimber according to an embodiment of the invention.
Figure 3:
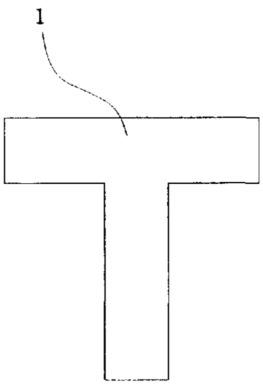
FIG. 3 is an end view of the T-shaped bamboo scrimber according to an embodiment of the invention.
Figure 4:
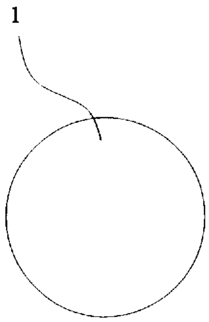
FIG. 4 is an end view of the circular bamboo scrimber according to another embodiment of the invention.

As shown in FIGS. 1 to 5, a bamboo scrimber 1 is made by bamboo strips (also referred to as “bamboo sliver”) 10. As shown in FIG. 1, the bamboo strips 10 are manufactured from a bamboo, such as “Mao” bamboo. Each bamboo strip 10 is formed with a plurality of slots **10*a* penetrating therethrough in a “thickness” direction of the bamboo strip 10. The plurality of slots 10*a* may be continuous or discontinuous in the “longitudinal” direction (i.e., the longitudinal direction of fibers of the bamboo strips 10) thereof. By forming the plurality of slots 10*a*, the surface area of the bamboo strip 10 and, thus, the impregnated adhesive content may be increased so that the rigidity of the bamboo strip 10 may be reduced, it is possible to avoid insufficient contact and softening of the bamboo strip 10 when pressed, and the bamboo scrimber made by pressing the bamboo strips 10** has a uniform density and smooth surfaces.

In an embodiment of the invention, because each bamboo strip 10 is formed with a plurality of slots **10*a*, the thickness of bamboo strip 10** may vary in a very wide range, for example, about 1.0 mm to about 4.5 mm.

Additionally, the bamboo strips 10 are modified through heat-treatment. Particularly, the bamboo strips 10 are first heated at about 100° C. to about 130° C. to absolute dryness. Herein, the term “absolute dryness” does not refer to the bamboo strips containing no water, but refers to water content in the bamboo strips being very small so that the subsequent hemicelluloses pyrolysing will not be affected. Then, most hemicelluloses or nearly all the hemicelluloses in the bamboo strips 10 are pyrolysed at about 150° C. to about 220° C. After hemicelluloses pyrolysing, the bamboo strips 10 are cooled to 90° C., and the moisture content of the bamboo strips 10 are adjusted by saturated steam.

By heat-treatment, most hemicelluloses or nearly all the hemicelluloses in the bamboo strips 10 are degraded mainly through pyrolysis, but celluloses and lignins in the bamboo strips 10 are hardly pyrolysed so that the physical and mechanical properties of the bamboo strips 10 may be changed permanently due to change of the chemical composition. Therefore, the bamboo scrimber 1 formed by the bamboo strips 10 has advantages of low water absorption, high size stability, and good biological durability.

The longitudinal direction of the plurality of slots 10*a* is consistent with that of fibers of the bamboo strips 10. In other words, the plurality of slots 10*a* are formed along the longitudinal direction of the bamboo strips 10 and penetrate through the bamboo strip 10 in the thickness direction.

Figure 5:
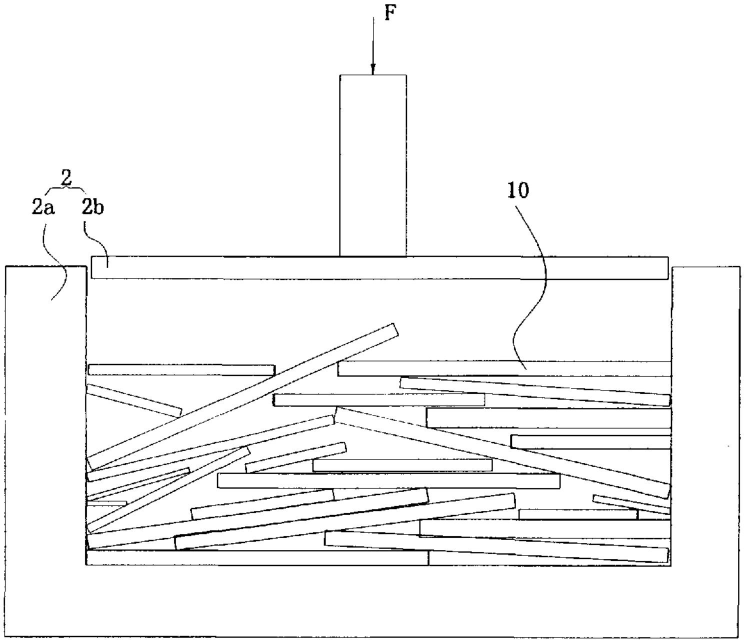
FIG. 5 is a view showing the bamboo strips being placed in a state of disorder in a mold to be pressed.

According to a further embodiment of the invention, as shown in FIG. 5, the bamboo strips 10 are arranged in state of disorder and parallel along the longitudinal direction of the fibers in a mold 2 comprising a lower half mold 2*a* and an upper half mold 2*b* so that the bamboo strips 10 are overlapped partially in a cross-section of the bamboo scrimber 1. That is to say, the bamboo strips 10 are not arranged layer-by-layer in the mold 2. Moreover, the longitudinal direction of the fibers of the bamboo strips is consistent. That is to say, the bamboo strips 10 are arranged parallel along the longitudinal direction of the fibers. Therefore, when closing the mold 2, the bamboo strips 10 contact with each other more easily so that the texture of bamboo scrimber 1 is more uniform, thus decreasing possibility of interlayer cracking of the bamboo scrimber 1.

The bamboo strips 10 are pressure-pressed after being impregnated with an adhesive. The adhesive may be a water-soluble resin such as phenolic resin, resorcinol-modified phenolic resin or melamine-modified phenolic resin. In the bamboo scrimber 1, the dry-weight ratio of the bamboo strips to the adhesive is about 20:1 to about 10:1.

Therefore, in embodiments of the invention, each bamboo strip 10 is formed with the plurality of slots 10*a*, thus increasing the impregnated adhesive content. The bamboo strips 10 are modified through heat-treatment so that the bamboo scrimber 1 may have more uniform density, smoother surfaces, and better size stability. Further, the bamboo scrimber 1 may not crack, deform, or degum and is not easily corroded by decay fungi and mycetes, has an increased biological durability, and is environment-friendly so that it is especially suitable for outdoor environments in which temperature and humidity may be changed dramatically and there are ultraviolet radiations (an anti-ultraviolet coating may be formed on the surfaces of the bamboo scrimber 1 in order to use in outdoor environments). For example, the bamboo scrimber 1 may be widely used for outdoor floors, outdoor furniture, outdoor buildings, park facilities, steam-bath-house facilities, etc.

Figure 6:
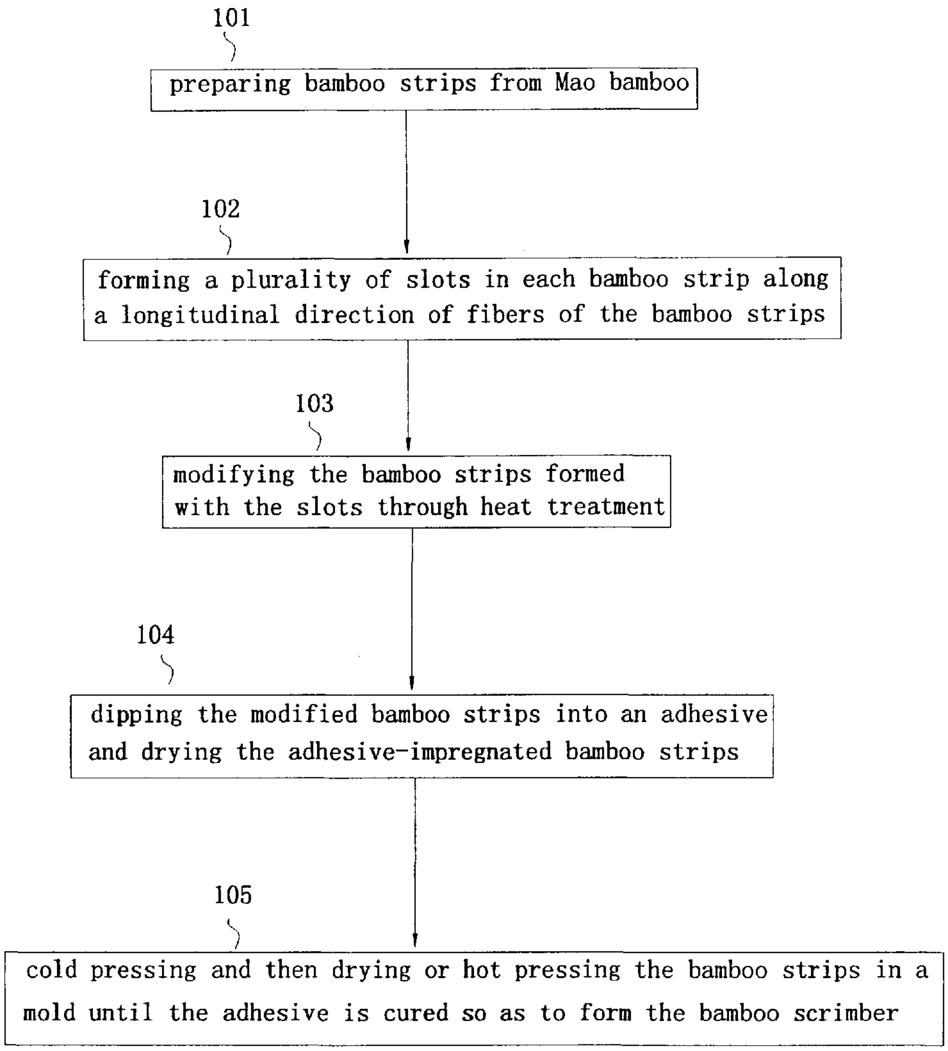
FIG. 6 is a flow chart of a manufacturing method of the bamboo scrimber according to an embodiment of the invention.

A manufacturing method of the bamboo scrimber according to an embodiment of the invention will be described with reference to FIG. 6. As shown in FIG. 6, the manufacturing method comprises the following steps:

Step 101: Mao bamboo is machined into bamboo strips having a thickness of about 1.0 mm to about 4.5 mm.

Step 102: A plurality of slots are formed in each bamboo strip. Particularly, the bamboo strips pass through a slot-forming machine and are rolled by toothed rolls of the slot-forming machine so that each bamboo strip is formed with a plurality of slots penetrating therethrough in a thickness direction thereof. The plurality of slots may be continuous or discontinuous in the longitudinal direction of the bamboo strips—i.e., the longitudinal direction of fibers of the bamboo strips—thus increasing the surface area of the bamboo strip and impregnated adhesive content, reducing the rigidity of the bamboo strip, and facilitating the pressing of the bamboo strips. The slot-forming machine may be any known slot-forming machine in the related art.

Step 103: The bamboo strips formed with slots are modified through heat-treatment in the absence of oxygen. Particularly, after stacking the bamboo strips (air-dried bamboo strips or wet bamboo strips), the bamboo strips are placed into a high-temperature heat-treatment furnace with good sealing and insulating properties or a heat-treatment tank having a heating device therein, which is filled with overheated steam or nitrogen as a protective gas. The heat for heating the bamboo strips and protective gas may be provided by the hot oil from a hot-oil furnace, high-temperature-furnace gas, or an electric heating tube. According to requirements of durability and color, the pressure in the high-temperature heat-treatment furnace or heat-treatment tank is about 0.1 MPa to about 0.6 MPa.

More particularly, the bamboo strips are subjected to multi-stage treatment in the high-temperature heat-treatment furnace or heat-treatment tank: the bamboo strips are heated at about 100° C. to about 130° C. to absolute dryness; then most hemicelluloses or nearly all the hemicelluloses in the bamboo strips are pyrolysed at about 150° C. to about 220° C.; after hemicelluloses pyrolysing, the bamboo strips are cooled to about 90° C.; and the moisture content of the bamboo strips are adjusted by using saturated steam.

It should be noted that the treatment is intended to modify the bamboo strips. For example, most hemicelluloses or nearly all the hemicelluloses in the bamboo strips may be degraded mainly through pyrolysis, but celluloses and lignins in the bamboo strips may be hardly pyrolysed, thus improving the dry-shrinkage and wet-swelling properties, size stability, biological durability, and anti-corrosion property of the bamboo scrimber and significantly reducing the hygroscopicity of the bamboo scrimber.

Step 104: The modified bamboo strips are dipped into an adhesive tank and then dried. For example, the bamboo strips are dipped in the adhesive for 5 to 20 minutes, then taken out of the adhesive tank, hanged to remove the excess adhesive, and placed in the air for aging or put in a drying kiln to dry at a low temperature, for example, lower than about 80° C. to a moisture content of not higher than about 20%. The adhesive is, for example, phenolic resin, resorcinol-modified phenolic resin, melamine-modified phenolic resin, or any other water-soluble resin with similar properties. During use, the adhesive is diluted to have a solid content of about 15% to about 30%.

Step 105: After weighing according to the required density, the bamboo strips are arranged and placed in the lower-half mold 2*a*. The bamboo strips are arranged parallel along the longitudinal direction of the bamboo strips, but in a state of disorder (see FIG. 5). That is, in the cross-section of the lower-half mold 2*a*, the bamboo strips are overlapped partially and not arranged layer-by-layer. The lower-half mold 2*a* is then moved into a pressure-forming machine with an upper-half mold 2*b* mounted thereon. Next, the bamboo strips in the mold 2 are hot-pressed or cold-pressed. If the hot-pressing process is used, the temperature is controlled to about 120° C. to about 150° C., and the pressure "F" is controlled to about 7 MPa to about 9 MPa. If the cold-pressing process is used, the pressure is controlled to about 45 MPa to about 70 MPa. After the bamboo strips are pressed and shaped to a specified size, the pressure is maintained, and the bamboo strips as well as the mold 2 are moved out of the pressure-forming machine, then moved into a drying room, and dried at about 100° C. to about 140° C. until the adhesive is cured, thus forming a bamboo scrimber.

In order to release internal stress of the bamboo scrimber, the bamboo scrimber may be stacked at room temperature. For example, the bamboo scrimber formed by hot-pressing is piled up, and then weights are placed on the stacked bamboo scrimber. After more than about 48 hours, the bamboo scrimber may be subject to the subsequent process. After being cold-pressed and curing, the bamboo scrimber may be stacked at room temperature for more than about 10 days. Of course, the bamboo scrimber may be subject to other treatments. For example, an anti-ultraviolet coating may be formed on the surfaces of the bamboo scrimber.

In some embodiments of the invention, after forming a plurality of slots in each bamboo strip, the bamboo strip may be dipped into an adhesive and then dried without being heat-treated. Then, the bamboo strips are hot- or cold-pressed to form the bamboo scrimber. Finally, the bamboo scrimber is modified through heat-treatment. The manufacturing method according to this embodiment of the invention has the same effect as the method shown in FIG. 6.

Examples of the manufacturing method of the bamboo scrimber according to some embodiments of the invention will be described below with reference to FIGS. 7 through 10.

Example 1

Figure 7:
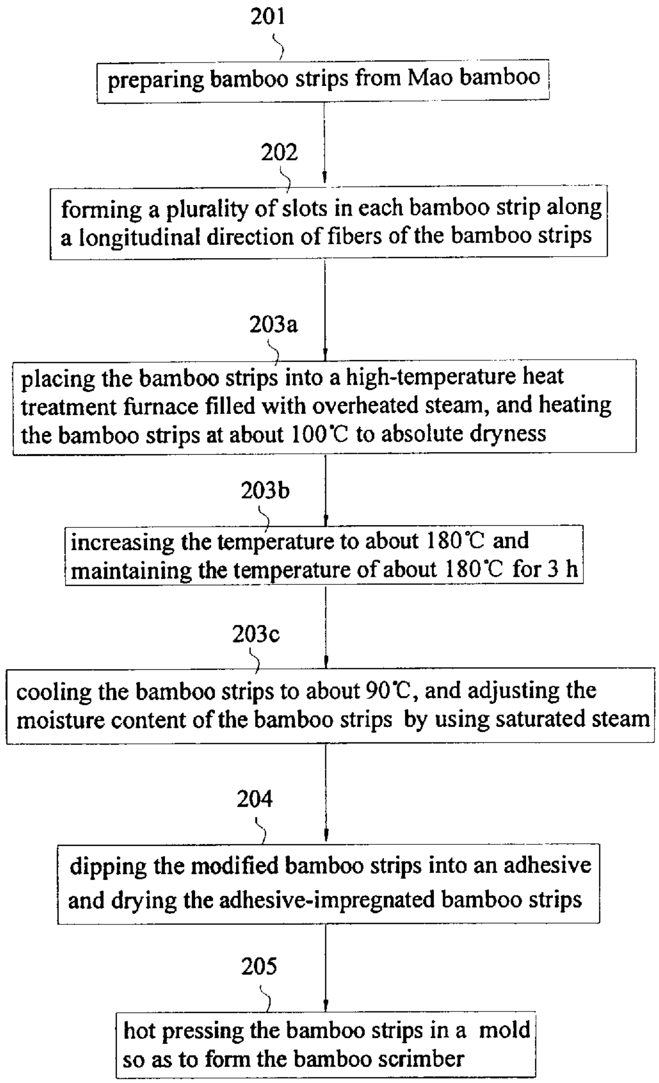
FIG. 7 is a flow chart of a manufacturing method of the bamboo scrimber by using the hot-pressing and curing process according to an example of the invention.

As shown in FIG. 7, a manufacturing method of a bamboo scrimber according to Example 1 comprises the following steps:

Step 201: Bamboo strips were prepared from Mao bamboo.

Step 202: A plurality of slots were formed in each bamboo strip. Particularly, air-dried bamboo strips or wet bamboo strips each having a thickness of about 3.5 mm and a width of about 25 mm passed through a slot-forming machine and were rolled by toothed rolls of the slot-forming machine so that each bamboo strip was formed with a plurality of slots penetrating therethrough in the thickness direction thereof. The plurality of slots were continuous or discontinuous in the longitudinal direction of the bamboo strip, thus softening the bamboo strips and increasing the impregnated adhesive content.

Step 203: The bamboo strips were modified. Particularly, the bamboo strips were tied into small bundles, piled up layer-by-layer, and placed into a high-temperature heat-treatment furnace that uses hot oil as the heating medium and over-heated steam as the protective medium. Then, the door of the high-temperature heat-treatment furnace was closed, the temperature was increased rapidly, and steam was inputted to the high-temperature heat-treatment furnace and became over-heated steam in the furnace. When the temperature had reached about 100° C., the heating rate slowed down, and the bamboo strips were heated to absolute dryness (Step 203*a*). After the temperature reached about 180° C., this temperature of about 180° C. was maintained for about 3 hours, thus modifying the bamboo strips—that is, pyrolysing most hemicelluloses or nearly all the hemicelluloses in the bamboo strips, but hardly pyrolysing celluloses and lignins in the bamboo strips. Then, the temperature was decreased. During the earlier cooling stage, the steam inlet and steam outlet of the high-temperature heat-treatment furnace were closed, and, during the later cooling stage, the steam inlet and steam outlet were opened to accelerate the cooling rate (Step 203*b*).

It should be noted that, when the temperature in the high-temperature heat-treatment furnace was in a range of about 150° C. to about 180° C., all the hemicelluloses in the bamboo strips may have been pyrolysed, but the pyrolysing rates were different at different temperatures. In this example, the temperature was increased rapidly to about 180° C. and maintained for 3 hours and then decreased so that the hemicelluloses in the bamboo strips were mainly pyrolysed at about 180° C.

When the temperature in the high-temperature heat-treatment furnace is decreased to a temperature lower than about 90° C., the steam inlet and steam outlet were closed, then saturated steam was inputted to the high-temperature heat-treatment furnace, and the bamboo strips were maintained in the saturated steam for 3 hours to adjust the moisture content of the bamboo strips (Step 203*c*). Finally, the steam inlet, steam outlet, and door were opened. When the temperature in the high-temperature heat-treatment furnace was decreased to a temperature lower than about 50° C., the bamboo strips were taken out.

Step 204: The heat-treated bamboo strips were dipped into an adhesive, and then the impregnated bamboo strips were dried. Particularly, phenolic resin was diluted to have a solid content of about 24%. The bamboo strips were dipped into the adhesive for 10 minutes to obtain an adhesive content of about 7% (i.e., the dry-weight ratio of the resin to the bamboo strips). Then, the bamboo strips were dried at a low temperature—for example, lower than about 70° C.—to a moisture content of about 15%.

Step 205: The dried bamboo strips were arranged and placed in the mold 2 and hot-pressed. Particularly, the amount of the bamboo strips were calculated, then the bamboo strips were weighed based on the density of about 1.0 g/cm$^3$, were arranged along the longitudinal direction of the bamboo strips in the lower-half mold 2*a* of a rectangular mold 2 with the bamboo strips being in a state of disorder in the cross-section of the lower-half mold 2*a* [that is, the bamboo strips were not arranged layer-by-layer (see FIG. 5)], and then moved into a hot-pressure-forming machine having an upper-half mold 2*b*. The upper-half mold 2*b* and lower-half mold 2*a* were closed. When the pressure was increased to about 4.0 MPa, the pressure-increasing was stopped, and a high-frequency generator generated high-frequency electromagnetic waves to heat the bamboo strips in the mold 2. After the temperature was increased to about 130° C., the pressure-increasing was started again until the pressure reached about 8.0 MPa. The pressure at about 8.0 MPa was maintained for about 15 minutes, then the pressure was decreased in stages, the steam in the mold 2 was discharged, and the rectangular bamboo scrimber was taken out.

The size and physical and mechanical properties of the bamboo scrimber were as follows:

Length×width×thickness: 2500 mm×600 mm×200 mm;

Density: 1.0 g/cm$^3$ to 1.1 g/cm$^3$;

Thickness swelling rate: ≤1.5% (measured after being soaked in water of 25° C. for 24 hours) and ≤2.5% (measured after being soaked in water of 25° C. for 48 hours);

Modulus of rupture (MOR): ≥100 MPa; and

Modulus of elasticity (MOE): ≥10,000 MPa.

Of course, as described above, in order to release the internal stress of the bamboo scrimber, the bamboo scrimber may be stacked as described above.

Example 2

Figure 8:
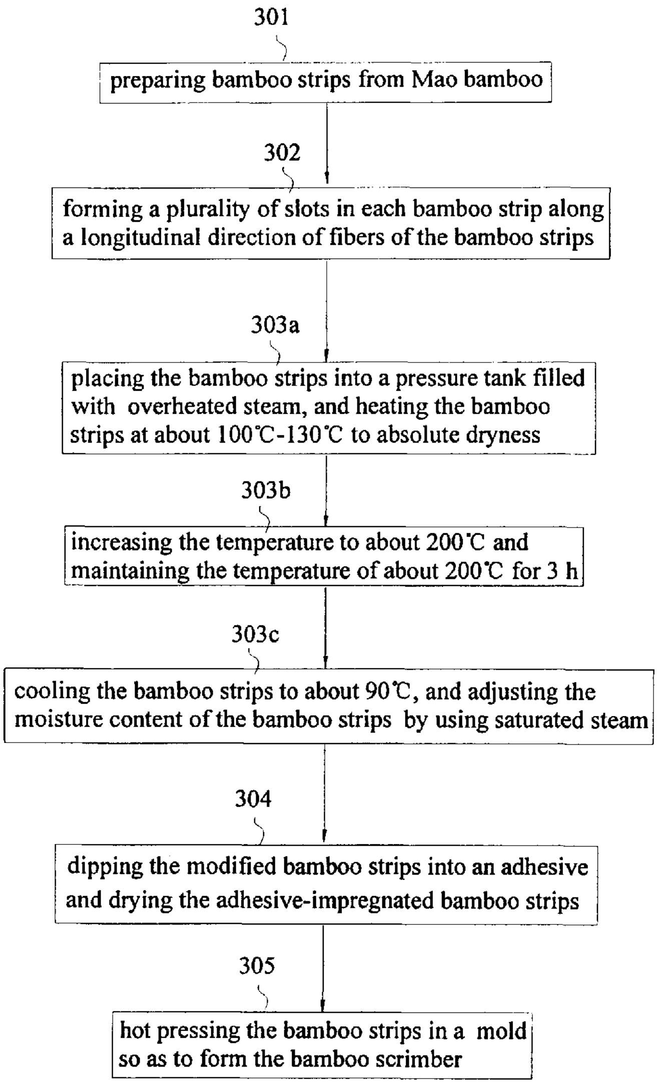
FIG. 8 is a flow chart of the manufacturing method of the bamboo scrimber by using the hot-pressing and curing process according to another example of the invention.

As shown in FIG. 8, a manufacturing method of a bamboo scrimber according to Example 2 comprises the following steps:

Step 301 and Step 302 are identical with Step 201 and Step 202 in Example 1, respectively. Therefore, the detailed descriptions thereof are omitted.

Step 303: The bamboo strips formed with slots were modified. Particularly, the bamboo strips were tied into small bundles, stacked layer-by-layer, and pushed into a pressure tank provided with an electric heating device. Then, the door of the pressure tank was closed, and saturated steam was inputted in the pressure tank. At the same time, an electric heating tube (as an example of the electric heating device in the pressure tank) was energized so that the steam became over-heated steam in the tank. The pressure in the pressure tank was maintained at about 0.4 MPa, and the temperature was increased slowly from 100° C. to 130° C. so that the bamboo strips were heated to absolute dryness (Step 303*a*). Then, the temperature was increased rapidly to about 200° C. and maintained at about 200° C. for about 3 hours (Step 303*b*), thus pyrolysing most hemicelluloses or nearly all the hemicelluloses in the bamboo strips at about 200° C., but hardly pyrolysing celluloses and lignins. Thereafter, the pressure was released, the overheated steam in the pressure tank was discharged, and saturated steam was inputted in the pressure tank, thus realizing rapid cooling. Then, the temperature was decreased naturally to about 90° C. and maintained at about 90° C. for 3 hours, thus adjusting the moisture content of the bamboo strips (Step 303*c*). Finally, the door of the pressure tank was opened to complete the heat-treatment of the bamboo strips.

Step 304 and Step 305 are identical with Step 204 and Step 205 in Example 1, respectively. Therefore, the detailed descriptions thereof are omitted.

Example 3

The manufacturing method of the bamboo scrimber according to Example 3 is substantially similar to that according to Example 1, except that the cross-section of the mold is T-shaped. And, the physical and mechanical properties of the bamboo scrimber according to Example 3 are also the same as those according to Example 1.

Example 4

The manufacturing method of the bamboo scrimber according to Example 4 differs from that according to Example 1 in that the cross-section of the mold 2 is circular and in the mold-filling and hot-pressing step. The amount of the bamboo strips were calculated and the bamboo strips were weighed based on the density of about 1.05 g/cm$^3$. The bamboo strips were arranged along an identical direction and in a state of disorder in the cross-section of the mold 2. The bamboo strips were arranged in the lower-half mold 2*a* of a semicircular mold and then moved to a hot-pressure-forming machine having a semicircular upper-half mold 2*b*. When the temperature reached about 60° C. to about 70° C., the mold 2 was closed with a highest pressure of about 7.5 MPa. At the same time, steam was inputted in the hot-pressure-forming machine to increase the temperature. When the temperature was increased to about 130° C., a timer was started. If the bamboo scrimber was designed to have a diameter of about 50 mm, after being maintained at about 7.5 MPa for 10 minutes, the highest pressure was decreased to about 4.5 MPa and maintained at about 4.5 MPa for 15 minutes. Then, cold water was inputted. Finally, when a thermometer read 50° C., the pressure was released completely, and the bamboo product was taken out.

Other steps in Example 4 and the physical and mechanical properties of the bamboo scrimber in Example 4 are the same as those in Example 1, respectively.

Example 5

As shown in FIG. 9, a manufacturing method of a bamboo scrimber according to Example 5 comprises the following steps:

Step 401 and Step 402 are identical with Step 201 and Step 202 in Example 1, respectively. Therefore, the detailed descriptions thereof are omitted.

Step 403: The bamboo strips formed with the slots were heat-treated at high temperature. Step 403*a* is identical with Step 203*a* in Example 1. In Step 403*b*, the temperature was increased to about 160° C., maintained at about 160° C. for 3 hours, and then decreased. Step 403*c* is identical with Step 203*c* in Example 1.

Step 404: Step 404 is identical with Step 204 in Example 1.

Step 405: The adhesive-impregnated and then dried bamboo strips were arranged in a rectangular mold 2 and cold-pressed. Particularly, the amount of the bamboo strips were calculated and the bamboo strips were weighed based on the density of about 1.05 g/cm$^3$. The bamboo strips were arranged along the longitudinal direction thereof and in a state of disorder in the lower-half mold 2*a* of a rectangular mold and then moved into a cold-pressure-forming machine having an upper-half mold 2*b*. The upper-half mold 2*b* and lower-half mold 2*a* were closed and pressurized in stages until the pressure was increased to about 68 MPa, then the pressure was released completely, and the mold 2 was pushed out of the cold-pressure-forming machine.

Step 406: The mold 2 as well as the pressed bamboo strips were moved into a drying room to cure the adhesive, and the temperature in the drying room was maintained at about 100° C. to about 130° C. until the adhesive was cured completely. Alternatively, the adhesive was cured by infrared ray.

The size and the physical and mechanical properties of the bamboo scrimber are as follows:

Length×width×thickness: 1900 mm×104 mm×160 mm;

Density: 1.0 g/cm$^3$ to 1.1 g/cm$^3$;

Thickness swelling rate: ≤1.5% (measured after being dipped in water of 25° C. for 24 hours) and ≤2.5% (measured after being dipped in water of 25° C. for 48 hours);

Modulus of rupture (MOR): ≥100 MPa; and

Modulus of elasticity (MOE): ≥10000 MPa.

Example 6

As shown in FIG. 10, a manufacturing method of a bamboo scrimber according to Example 6 comprises the following steps:

Step 501: Mao bamboo was machined into bamboo strips.

Step 502: A plurality of slots were formed in each bamboo strip.

Step 504: The bamboo strips formed with slots were dipped into an adhesive, and the impregnated bamboo strips were dried.

Step 505: The dried bamboo strips were placed in a mold and hot-pressed at about 130° C. under a pressure of about 8 MPa to produce a rectangular bamboo scrimber.

Step 503: The bamboo scrimber was subject to modifying. Particularly, the bamboo scrimber was piled up and placed into a high-temperature heat-treatment kiln that uses hot oil as a heating medium and overheated steam as a protective medium. Then, the door of the kiln was closed, the temperature was increased rapidly, and steam was inputted in the kiln and became overheated steam. When the temperature had reached about 100° C., the heating rate slowed down, and the bamboo scrimber was heated to absolute dryness (Step 503*a*). Thereafter, the temperature was increased to about 160° C. and maintained at about 160° C. for about 4 hours, thus pyrolysing most hemicelluloses or nearly all the hemicelluloses in the bamboo strips at about 160° C. Then, the temperature was decreased (Step 503*b*). During the earlier cooling stage, the steam inlet and steam outlet of the kiln were closed. And, during the later cooling stage, the steam inlet and steam outlet were opened to accelerate the cooling rate. When the temperature in the furnace dropped to a temperature lower than about 90° C., the steam inlet and steam outlet were closed, and then saturated steam was inputted in the kiln for 3 hours to adjust the moisture content of the bamboo strips (Step 503*c*). Finally, the steam inlet, steam outlet, and door were opened. When the temperature in the kiln dropped to a temperature lower than about 50° C., the bamboo scrimber was taken out of the kiln.

With the manufacturing method of the bamboo scrimber according to Example 6, before forming the bamboo scrimber, the bamboo strips were not heat-treated to be modified. Instead, the formed bamboo scrimber was modified. The manufacturing method of the bamboo scrimber according to Example 6 has the same effect as those according to Examples 1 through 5.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A bamboo scrimber comprising:

a plurality of pressure-pressed bamboo strips impregnated with an adhesive and modified through heat-treatment so that at least a part of hemicelluloses in said bamboo strips is pyrolysized, wherein each of said bamboo strips is formed with a plurality of slots penetrating through said bamboo strip substantially in a direction of thickness defined by said bamboo strip and a substantially longitudinal direction defined by said slots is substantially consistent with a substantially longitudinal direction defined by fibers of said bamboo strip.

2. A bamboo scrimber as set forth in claim 1, wherein said bamboo strips are in a state of disorder in a cross-section defined by said bamboo scrimber and arranged substantially parallel with said longitudinal direction of said fibers.

3. A bamboo scrimber as set forth in claim 1, wherein a dry-weight ratio of said bamboo strips to said adhesive is in a range of about 20:1 to about 10:1.

4. A bamboo scrimber as set forth in claim 1, wherein each of said bamboo strips defines a thickness of said bamboo strip in a range of about 1.0 mm to about 4.5 mm.

5. A bamboo scrimber as set forth in claim 1, wherein said adhesive is a water-soluble resin.

6. A bamboo scrimber as set forth in claim 5, wherein said water-soluble resin is one selected from a group consisting of phenolic resin, resorcinol-modified phenolic resin, and melamine-modified phenolic resin.

7. A bamboo scrimber as set forth in claim 1, wherein said pressure-pressed bamboo strips are either of cold-pressed and hot-pressed.

8. A method of manufacturing a bamboo scrimber comprising steps of:

preparing bamboo strips from bamboo;

forming a plurality of slots in each of the prepared bamboo strips penetrating through the bamboo strip substantially in a direction of thickness defined by the bamboo strip and a substantially longitudinal direction defined by the slots is substantially consistent with a substantially longitudinal direction defined by fibers of the bamboo strip;

modifying the formed bamboo strips through heat-treatment so that at least a part of hemicelluloses in said bamboo strips is pyrolysized;

impregnating the modified bamboo strips into an adhesive;

drying the impregnated bamboo strips; and pressure-pressing the dried bamboo strips in a mold until the adhesive is cured so as to form the bamboo scrimber.

9. A method of manufacturing a bamboo scrimber as set forth in claim 8, wherein the bamboo strips are arranged in a state of disorder in a cross-section defined by the mold and substantially parallel with the longitudinal direction of the fibers in the mold.

10. A method of manufacturing a bamboo scrimber as set forth in claim 8, wherein the step of pressure-pressing includes the step of either of cold-pressing and then drying and hot-pressing.

11. A method of manufacturing a bamboo scrimber as set forth in claim 10, wherein the cold-pressing is performed under a pressure in a range of about 45 MPa to about 70 MPa and the drying after the cold-pressing is performed at a temperature in a range of about 100° to about 140°.

12. A method of manufacturing a bamboo scrimber as set forth in claim 10, wherein the hot-pressing is performed at a temperature in a range of about 120° to about 150° under a pressure in a range of about 7 MPa to about 9 MPa.

13. A method of manufacturing a bamboo scrimber as set forth in claim 8, wherein the heat-treatment includes steps of heating the bamboo strips to absolute dryness and cooling the pyrolysized bamboo strips.

14. A method of manufacturing a bamboo scrimber as set forth in claim 13, wherein the heat-treatment includes further a step of using saturated steam to adjust content of moisture of the cooled bamboo strips.

15. A method of manufacturing a bamboo scrimber as set forth in claim 13, wherein the step of heating is performed at a temperature in a range of about 100° C. to about 130° C., the step of pyrolysing is performed at a temperature in a range of about 150° C. to about 220° C., and the pyrolysized bamboo-strips scrimber are cooled to a temperature lower than about 90° C.

16. A method of manufacturing a bamboo scrimber comprising steps of:

preparing bamboo strips from bamboo;

forming a plurality of slots in each of the prepared bamboo strips penetrating through the bamboo strip substantially in a direction of thickness defined by the bamboo strip and a substantially longitudinal direction defined by the slots is substantially consistent with a substantially longitudinal direction defined by fibers of the bamboo strip;

impregnating the formed bamboo strips into an adhesive;

drying the impregnated bamboo strips;

pressure-pressing the dried bamboo strips in a mold until the adhesive is cured so as to form the bamboo scrimber; and modifying the bamboo scrimber through heat-treatment so that at least a part of hemicelluloses in said bamboo scrimber is pyrolysized.

17. A method of manufacturing a bamboo scrimber as set forth in claim 16, wherein the heat-treatment includes steps of heating the bamboo scrimber to absolute dryness and cooling the pyrolyzed bamboo scrimber.

18. A method of manufacturing a bamboo scrimber as set forth in claim 16, wherein the step of heating is performed at a temperature in a range of about 100° C. to about 130° C., the step of pyrolysing is performed at a temperature in a range of about 150° C. to about 220° C., and the pyrolysized bamboo strips are cooled to a temperature lower than about 90° C.

19. A method of manufacturing a bamboo scrimber as set forth in claim 16, wherein the step of pressure-pressing includes the step of either of cold-pressing and then drying and hot-pressing.

* * * * *